(No Model.)

P. B. ANDERSON.
Corn and Pea Planter.

No. 237,798.  Patented Feb. 15, 1881.

WITNESSES:
W. W. Hollingsworth
Wm H Rowe

INVENTOR:
P. B. Anderson
BY
ATTORNEYS.

N. PETERS, PHOTO-LITHOGRAPHER, WASHINGTON, D. C.

UNITED STATES PATENT OFFICE.

PIERCE B. ANDERSON, OF BROWNSVILLE, TENNESSEE.

CORN AND PEA PLANTER.

SPECIFICATION forming part of Letters Patent No. 237,798, dated February 15, 1881.

Application filed July 12, 1880. (No model.)

*To all whom it may concern:*

Be it known that I, PIERCE B. ANDERSON, of Brownsville, in the county of Haywood and State of Tennessee, have invented a new and Improved Corn and Pea Planter; and I do hereby declare that the following is a full, clear, and exact description of the same.

My invention relates to that class of machines known as "walking-planters," in which the frame and hopper are supported upon a large roller-wheel arranged in the wake of the opener immediately after the seed is deposited, and is guided and controlled by handles secured to the frame.

My invention consists in a lever mechanism for operating the seed-slide, as will hereinafter appear.

Figure 1:
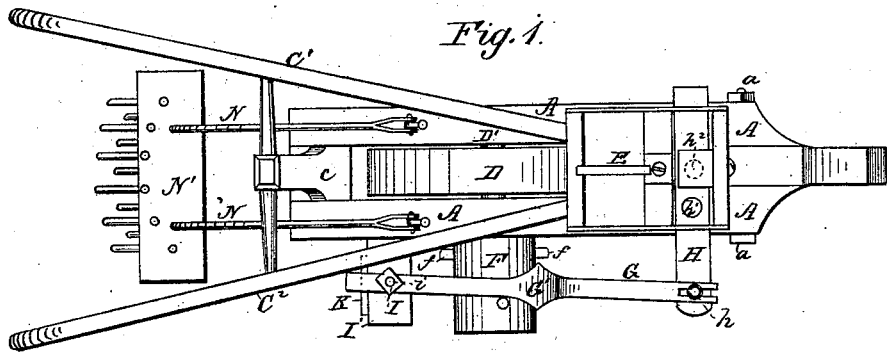
Figure 2:
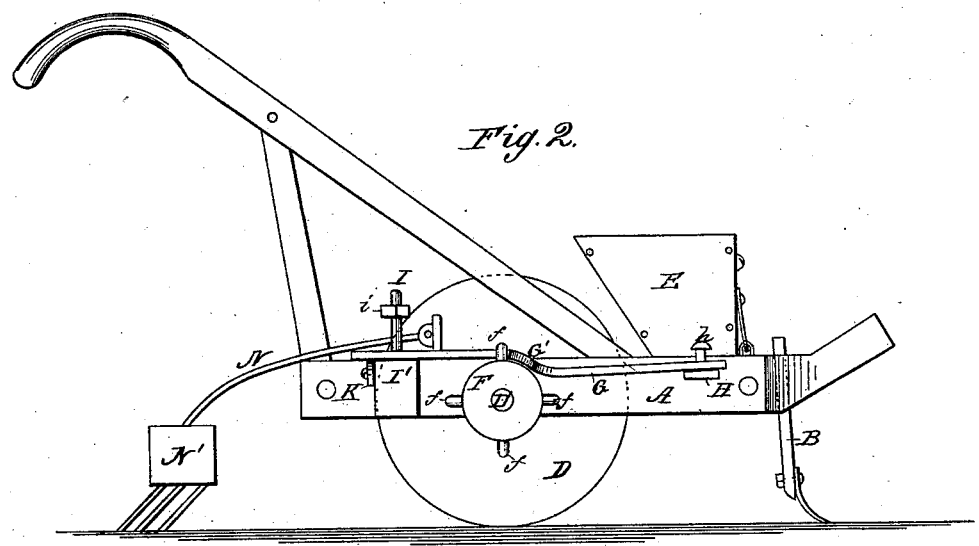
Figure 4:
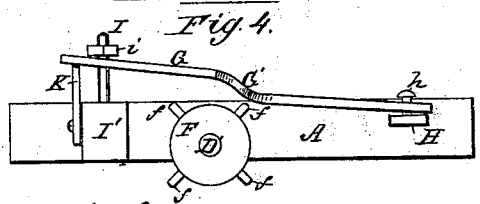
Figure 3:
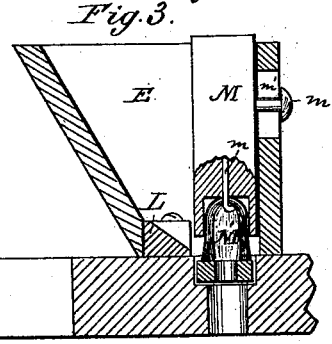

In the accompanying drawings, Figure 1 is a plan view of a planter constructed according to my invention. Fig. 2 is a side elevation of the same; Fig. 3, an enlarged transverse section through the hopper and dropper mechanism detached, and Fig. 4 a detailed elevation of the seed-slide lever in its inoperative position.

The frame A is formed of two rectangular rails, connected at their front ends by a draft-block, to which the opening-blade B is attached, and the rear ends are connected by the lower end of a post, C, to which are braced the handles C' C². A bolt, $a$, passes through the draft-block and front ends of the frame-pieces and securely clamps them together, and a similar bolt secures the lower end of the post between the rear ends of the frame-rails. The frame is supported upon a roller-wheel, D, arranged between the frame-rails immediately behind the hopper E, to follow in the wake of the opener-blade after the seed is deposited, and serves to press them firmly in the earth, so as to insure speedy germination.

To the axle D' of wheel D is secured a hub, F, provided with stud-pins $f$, projecting radially from it, arranged in sets upon the inner and outer ends of the hub, so that the pins of one set will come midway between the pins of the other set.

A lever, G, provided with a notch in its front end, that engages with a pin, $h$, in the feed-slide H, is fulcrumed at its rear end to a pin, I, that projects vertically from a block, I', secured to one of the side rails of the frame. The pin passes through a hole bored in the end of the lever, and is provided with a nut, $i$, that screws onto its upper end and prevents the accidental removal of the lever from the pin. The lever G is by the above-described means suspended horizontally at one side of the machine, so that its middle portion will rest upon the upper side of the hub F. The middle portion, G', of the lever is bent to conform to the surface of the hub for a short distance, and is enlarged laterally by angular projections, in such manner that the portion G' of the lever will rest upon the hub and be pushed from side to side by alternate contact with the pins upon the outer and inner ends of the hub. As one end of the lever is fulcrumed to the pin I and the other end is loosely pivoted to the feed-slide H of the hopper, the feed-slide is thus reciprocated across the bottom of the hopper at regular intervals.

It will be readily seen in Fig. 2 that the lever will not be shifted from side to side by the pins when the hub is revolved in the opposite direction or backward movement, as the lever is suspended above the hub in such manner that the pins will pass beneath the enlarged portion G' when so revolved and lift it vertically, while the pins will strike the sides of the lever and vibrate it when the roller-wheel is making a forward movement.

In order to throw the lever entirely out of gear with the pins, a latch-block, K, is pivoted to block I' in such manner that it may be turned up beneath the end of the lever and hold it firmly against the nut $i$ upon the fulcrum-pin, so as to be at all times out of contact with the pins upon the hub.

The feed-slide H is fitted snugly in a groove cut across the forward ends of the frame-rails and the interposed draft-block, so that the upper surface of the slide will be flush with the upper surface of the frame. The slide has two circular holes, $h'$ $h^2$, cut through it midway of its length, or equidistant from each end, formed with flaring sides from top to bottom. A bevel-faced block, L, is secured transversely across the frame, and forms an abutment for the inner side of the rear end of the hopper, and deflects the seed toward the holes in the feed-slide.

A brush-block, M, formed of a rectangular piece, is arranged vertically against the inner side of the front end of the hopper, and is provided with a brush, M', formed of bristles, secured over an eye or loop pin, m, in a cylindrical recess in the lower end of the block, so that a hollow cylindrical brush is formed which will sweep the surface of the slide to admit a limited amount of seed to enter the openings in the slide and insure their delivery from the said openings. The cylindrical form of the brush will provide an opening large enough to receive the seed immediately above the discharge-opening, and upon the seed being drawn into said opening by the slide will inclose it upon all sides and prevent it from being drawn back by the slide into the seed-receptacle. The block is adjustably secured to the hopper by means of a slotted opening, m', in the hopper, and a set-screw, m², that passes through the slot into the block. The degree of pressure of the brush against the slide is thus easily regulated. The brush-block is arranged immediately over the slide in the middle of the hopper, and also over a delivery-opening below the slide in the frame, and as the slide is reciprocated the seed will be delivered by the holes in the slide to the openings alternately from opposite sides of the block. The block is provided with a groove in its inner face, and the rear side of the hopper is similarly grooved in a line opposite the first-named groove, so that a partition, N, may be readily placed in the grooves to separate the hopper into two compartments, one upon each side of the brush-block. The two compartments may be filled with seed of different kinds, such as corn and pease, and by means of the action of the slide above described the seed will be received and dropped alternately from each of the hoppers, so that the row will be planted in corn and pease alternately.

The rear end of the side rails of the machine are provided with pins, to which are hinged rods N, that carry a harrow, N', so that it will trail behind the roller-wheel and cover the seed with loose earth.

What I claim as new is—

1. In a corn and seed planter, the feed-slide, in combination with and operated by a lever, G, loosely pivoted at one end to the slide H, and fulcrumed at the other end to a vertical pin, I, secured to the frame, so that the lever is held horizontally at one side of the frame, and the hub F, secured to the axle of the supporting-wheel, provided with stud-pins, that act against the sides of the lever G when moving forward to vibrate the lever and feed-slide, and will pass beneath the lever to lift it only without vibrating the slide, in the manner and for the purpose described.

2. In a corn and seed planter, the combination, with the frame of the machine, of the hopper E, feed-slide H, the supporting-wheel and its hub F, provided with stud-pins f, arranged as described, and lever G, pivoted to the slide and fulcrumed at one end to a vertical pin, I, on the frame, and vibrated by the pins upon the hub, and latch K, for holding the lever out of contact with the pins, to render the slide inoperative when desired, substantially as described.

PIERCE BUTLER ANDERSON.

Witnesses:
W. E. GOODE,
W. B. MALONE.